United States Patent
Libal et al.

(10) Patent No.: US 10,061,390 B2
(45) Date of Patent: Aug. 28, 2018

(54) BUILDING SPACE CONTROL

(71) Applicant: Honeywell International Inc., Morristown, NJ (US)

(72) Inventors: Vit Libal, Prague (CZ); Neil Garland, Crawley (GB); Pavel Vacha, Prague (CZ); Graham Whiting, Worthing (GB); Erwan Rivet, Nyon (CH)

(73) Assignee: Honeywell International Inc., Morris Plains, NJ (US)

( * ) Notice: Subject to any disclaimer, the term of this patent is extended or adjusted under 35 U.S.C. 154(b) by 223 days.

(21) Appl. No.: 14/802,566

(22) Filed: Jul. 17, 2015

(65) Prior Publication Data

US 2017/0017302 A1 Jan. 19, 2017

(51) Int. Cl.
*G06K 9/00* (2006.01)
*G06F 3/01* (2006.01)
*G06F 3/0481* (2013.01)

(52) U.S. Cl.
CPC .......... *G06F 3/017* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 2012/0031984 A1 | 2/2012 | Feldmeier et al. | |
| 2013/0204408 A1 | 8/2013 | Thiruvengada et al. | |
| 2013/0249786 A1* | 9/2013 | Wang | G06F 3/011 345/156 |
| 2013/0255909 A1 | 10/2013 | Matsumoto | |
| 2014/0191938 A1* | 7/2014 | Ybanez Zepeda | G06F 3/017 345/156 |
| 2014/0244037 A1 | 8/2014 | Scott et al. | |
| 2014/0320408 A1* | 10/2014 | Zagorsek | G06F 3/017 345/158 |
| 2015/0055323 A1 | 2/2015 | Schreiber | |

FOREIGN PATENT DOCUMENTS

JP 2013213610 A 10/2013

OTHER PUBLICATIONS

International Search Report and Written Opinion from related PCT Application No. PCT/US2016/041978, dated Sep. 12, 2016, 11 pages.

* cited by examiner

*Primary Examiner* — Weiwen Yang
(74) *Attorney, Agent, or Firm* — Brooks, Cameron & Huebsch, PLLC

(57) ABSTRACT

Methods, devices, and systems for building space control are described herein. One device includes a memory, and a processor configured to execute executable instructions stored in the memory to receive a recording of a gesture interaction with a virtual control element associated with a setting of a space in a building, analyze the recorded gesture for gesture characteristics, and modify the setting of the space based on the virtual control element and the gesture characteristics.

17 Claims, 4 Drawing Sheets

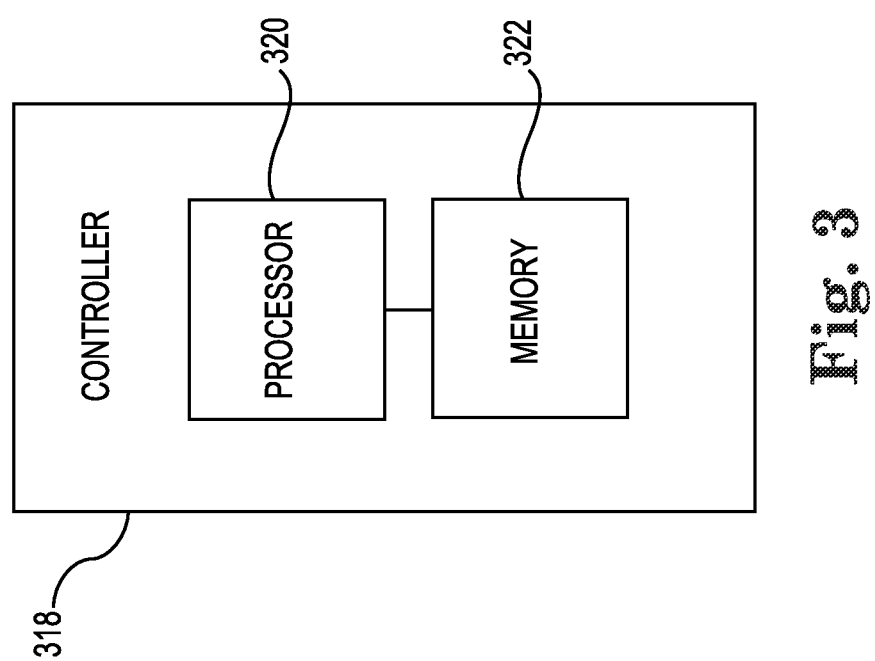

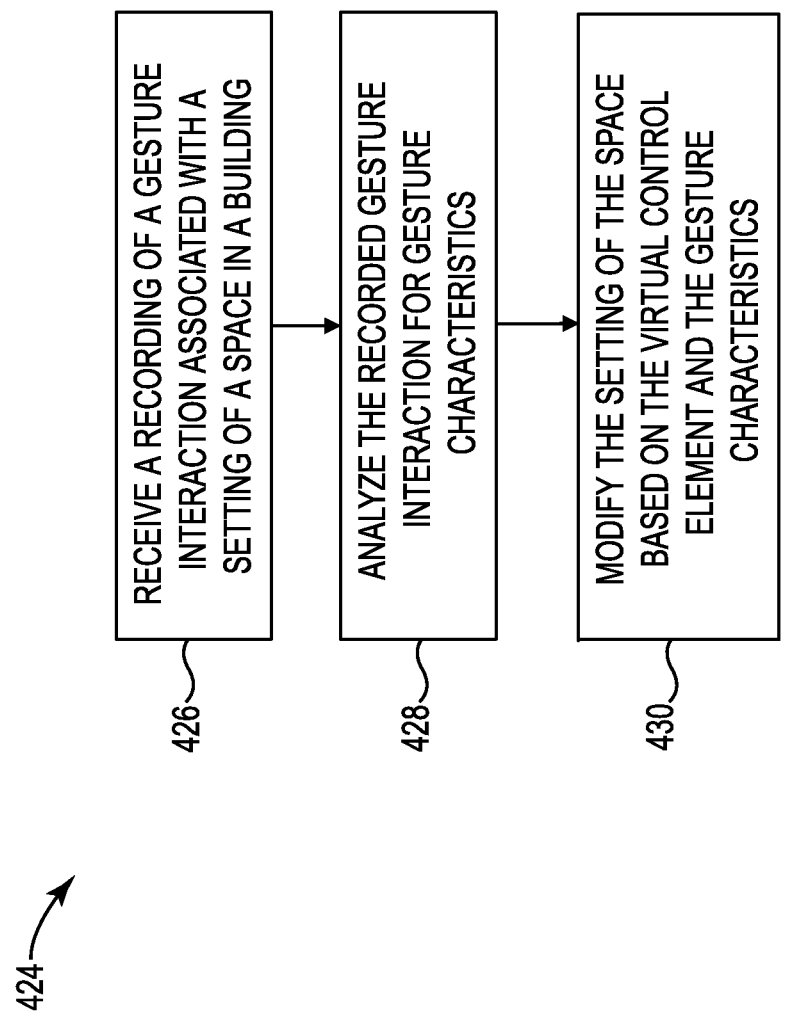

BUILDING SPACE CONTROL

TECHNICAL FIELD

The present disclosure relates to methods, devices, and systems for building space control.

BACKGROUND

Settings of spaces in a building can be controlled by physical hardware installed in the building. For example, a heating, ventilation, and air/conditioning (HVAC) system can be controlled by a thermostat connected to an HVAC control system by electrical wiring. As another example, lighting within a building space can be controlled by a switch that can be located on a wall close to an entrance to the building space.

However, installation of physical hardware associated with building space settings can be expensive. Timing of installation of different building systems can be difficult to predict. For example, installation of HVAC controls during construction of a building may not be possible until installation of plumbing systems is completed. Delays in construction can lead to higher construction costs. Further, hardware such as thermostats, switches, and/or wiring can be costly to purchase.

Once a building is occupied, setting controls may be distantly located from a user. For example, a user that desires to change a setting of the space in a building may need to leave their work area in order to access a thermostat and/or switch to change a space setting, which can result in lost time and productivity. As another example, inconvenient position of switches and other controls may occur as a result of a space in a building being refurnished due to a tenant change and/or a change in use of the space, since wiring changes of switches and other controls can be difficult and/or expensive.

BRIEF DESCRIPTION OF THE DRAWINGS

FIG. 3 is a schematic block diagram of a controller for building space control, in accordance with one or more embodiments of the present disclosure.

FIG. 4 is a flow chart of a method for building space control, in accordance with one or more embodiments of the present disclosure.

DETAILED DESCRIPTION

Figure 1:
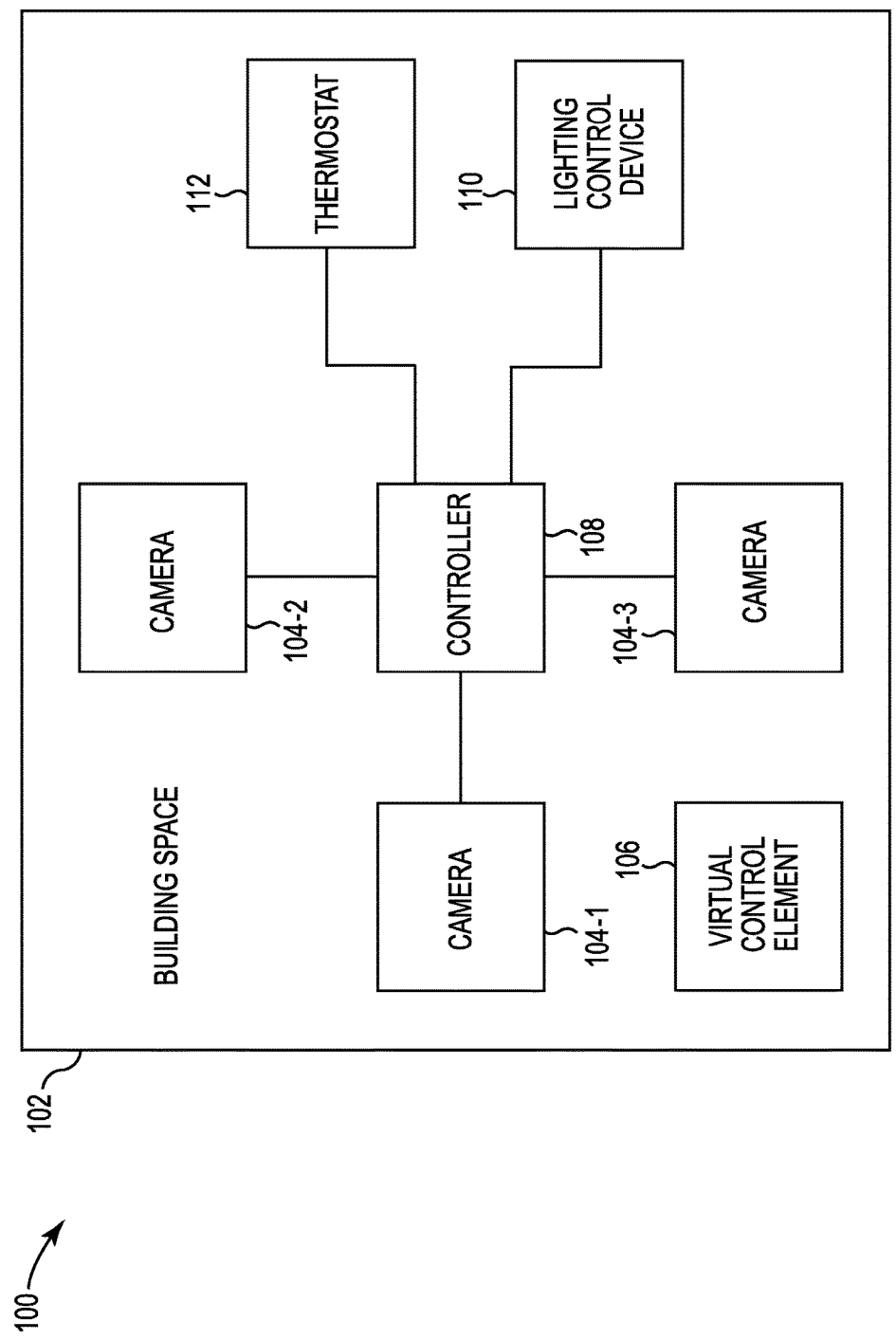
FIG. 1 illustrates a system for building space control, in accordance with one or more embodiments of the present disclosure.

Methods, devices, and systems for building space control are described herein. For example, one or more embodiments include a memory, and a processor configured to execute executable instructions stored in the memory to receive a recording of a gesture interaction with a virtual control element associated with a setting of a space in a building, analyze the recorded gesture for gesture characteristics, and modify the setting of the space based on the virtual control element and the gesture characteristics.

Building space control, in accordance with the present disclosure, can allow for a convenient control mechanism by utilizing a camera or a number of cameras to receive and analyze gesture interactions with virtual control elements for use in controlling settings in a building space. Virtual control elements can be defined in the building space, which can allow for flexibility in placement. The flexibility in placement options of virtual control elements can allow for easy and convenient control of settings within the building space. Further, use of virtual control elements can obfuscate the need for expensive dedicated control hardware, which can result in faster construction times and reduce construction costs.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of cameras" can refer to one or more cameras.

FIG. 1 illustrates a system 100 for building space control, in accordance with one or more embodiments of the present disclosure. As shown in FIG. 1, the system 100 can include building space 102, cameras 104-1, 104-2, and 104-3, virtual control element 106, controller 108, lighting control device 110, and thermostat 112.

Controller 108 can receive, from cameras 104-1, 104-2, and 104-3, a recording of a gesture interaction with virtual control element 106 associated with a setting of space 102 in a building, as will be further described herein. A gesture interaction, as used herein, can include an interaction by a user with virtual control element 106. For example, an interaction by the user can include a type of hand configuration by the user in front of virtual control element 106, such as a finger configuration (e.g., all fingers raised and spread apart, or all fingers raised and held together) or a combination of fingers configured in a unique way (e.g., pointer finger raised, or pointer and middle finger raised).

Although a gesture interaction is described as a type of hand configuration including a number of finger configurations, embodiments of the present disclosure are not so limited. For example, a gesture interaction can include any other type of unique user limb configuration for interaction with virtual control element 106.

The recording of a gesture interaction can be received by controller 108 from cameras 104-1, 104-2, and 104-3 in building space 102. For example, cameras 104-1, 104-2, and 104-3 can record a gesture interaction by a user with virtual control element 106 and transmit the recording to controller 108 via a network relationship. For example, the recording of the gesture interaction can be transmitted to controller 108 via a wired or a wireless network.

The wired or wireless network can be a network relationship that connects cameras 104-1, 104-2, and 104-3 to controller 108. Examples of such a network relationship can include a local area network (LAN), wide area network (WAN), personal area network (PAN), a distributed computing environment (e.g., a cloud computing environment), and/or the Internet, among other types of network relationships.

Although not shown in FIG. 1 for clarity and so as not to obscure embodiments of the present disclosure, building space 102 can include more than one virtual control element 106. For example, building space 102 can include multiple virtual control elements 106.

A camera, as used herein, can refer to a device that can be used for electronic motion picture acquisition. Cameras 104-1, 104-2, and 104-3 can be, for example, dome cameras located in building space 102. Cameras 104-1, 104-2, and 104-3 can include specifications to allow cameras 104-1, 104-2, and 104-3 to record a gesture interaction with virtual control element 106 by a user. For instance, cameras 104-1, 104-2, and 104-3 can have a wide angle of view (e.g., a camera including a wide angle lens) with high resolution (e.g., a camera including high-definition video capture capability). Additionally, cameras 104-1, 104-2, and 104-3 can have a dynamic range and contrast sufficient to allow for recording of gesture interactions with virtual control element 106 in varying lighting conditions in building space 102.

Although building space 102 is shown in FIG. 1 as including three cameras, embodiments of the present disclosure are not so limited. For example, building space 102 can have less than three cameras or more than three cameras.

Cameras 104-1, 104-2, and 104-3 can be positioned in building space 102 such that the views' of cameras 104-1, 104-2, and 104-3 of virtual control element 106 are not obstructed. For example, cameras 104-1, 104-2, and 104-3 can be positioned in building space 102 so that each camera can view virtual control element 106 without having an obstruction to prevent cameras 104-1, 104-2, and 104-3 from recording a gesture interaction by a user with virtual control element 106.

In some embodiments with multiple virtual control elements 106, cameras 104-1, 104-2, and 104-3 can be positioned so that each virtual control element 106 can be observed by at least one camera (e.g., cameras 104-1, 104-2, and/or 104-3). The at least one camera observing each virtual control element 106 can be placed to ensure there are no obstructions of the views of virtual control elements 106.

Cameras 104-1, 104-2, and 104-3 can be positioned in building space 102 statically. For example, cameras 104-1, 104-2, and 104-3 can be positioned in building space 102 during building construction such that at least one of cameras 104-1, 104-2, and 104-3 can view potential virtual control element 106 placement locations within building space 102.

In some embodiments, when placing virtual control element 106, a user can be notified when a potential occlusion of virtual control element 106 from cameras 104-1, 104-2, and 104-3 may exist. For example, when placing a virtual control element 106 in a location within building space 102, a user can be notified by a graphical user interface of a mobile device that a potential occlusion of virtual control element 106 from cameras 104-1, 104-2, and 104-3 may exist. The user can, based on the notification, modify the placement of virtual control element 106.

Although described as a user receiving a notification by a graphical user interface of a mobile device, embodiments of the present disclosure are not so limited. For example, a user can be notified of a potential occlusion from cameras 104-1, 104-2, and 104-3 by an audible noise of a mobile device or a speaker within building space 102, among other means of notification.

Virtual control element 106 can be a sticker. For example, virtual control element 106 can be a sticker that can be placed in building space 102 in a location that can allow cameras 104-1, 104-2, and 104-3 to record a gesture interaction, such as a hand touching the sticker, by a user with the sticker.

The sticker as virtual control element 106 can have distinguishing features. For example, the distinguishing features can include color (e.g., yellow, blue, green, etc.), shape (e.g., square, triangular, rectangular, etc.), reflectivity, and/or texture. The distinguishing features of the sticker as virtual control element 106 can distinguish the function of virtual control element 106 from other virtual control elements located in building space 102. For example, a square sticker can function as a switch, and a rectangular sticker can function as a slider, as will be further described herein.

Although virtual control element 106 as a sticker is described as having distinguishing features including color, shape, reflectivity, and/or texture, embodiments of the present disclosure are not so limited. For example, the distinguishing features of the sticker can include any other characteristics of the sticker.

Virtual control element 106 can be created by a structured light. As used herein, a structured light can be a projection of a known pattern of pixels on to a scene. For example, virtual control element 106 can be projected on to a wall for a user to interact with by a gesture interaction.

As used herein, a scene can include any surface on which virtual control element 106 can be projected. For example, a structured light as virtual control element 106 can be projected on to a wall, desktop, or any other surface on which a user can interact with the structured light as virtual control element 106 by a gesture interaction.

The structured light as virtual control element 106 can be projected with different patterns. The different patterns can be used to distinguish the function (e.g., button, slider, or switch) of virtual control element 106 from other virtual control elements located in building space 102, as will be further described herein. For example, a pattern can include a projected grid, shape, and/or combination thereof, although embodiments of the present disclosure are not so limited.

In some embodiments, the structured light as virtual control element 106 can be permanently projected on to a scene. For example, structured light as virtual control element 106 can be projected on to the scene for an entire day.

In some embodiments, the structured light as virtual control element 106 can vary projection times to a scene. For example, the structured light as virtual control element 106 can be projected on to the scene when a user enters building space 102. As another example, the structured light as virtual control element 106 can be projected on to the scene only at certain times of the day (e.g., during regular business hours).

Virtual control element 106 can be a defined area in building space 102. A user can interact with the defined area as virtual control element 106 in building space 102 with a gesture interaction. For example, the defined area as virtual control element 106 can be a portion of a user's desktop with which the user can interact with a gesture interaction. As another example, the defined area as virtual control element 106 can be a top edge of a user's computer monitor that may be located on a user's desktop.

Although the defined area as virtual control element 106 is described as being a portion of a user's desktop or the top edge of a user's computer monitor, embodiments of the present disclosure are not so limited. For example, the defined area as virtual control element 106 can be any area in building space 102 with which a camera (e.g., cameras 104-1, 104-2, and/or 104-3) can record a gesture interaction by a user with the defined area as virtual control element 106.

Virtual control element 106 can function as a button, a slider, or a switch. For example, virtual control element 106 can function as a button to effect a change of a setting (e.g., ON or OFF) of building space 102 based on gesture characteristics associated with a button. Additionally, virtual control element 106 can function as a switch (e.g., ON or OFF) to effect a change of a setting of building space 102 based on gesture characteristics associated with a switch. Further, virtual control element 106 can function as a slider to effect a gradual change of a setting of building space 102.

Controller 108 can analyze the recorded gesture interaction for gesture characteristics. Gesture characteristics can include a direction of the gesture interaction, a speed of the gesture interaction, a shape of the gesture interaction, and a position of the gesture interaction. The recorded gesture interaction can be analyzed to determine intentional gestures from non-intentional gestures using gesture characteristics, as will be further described herein.

The recorded gesture interaction can be analyzed for a direction of the gesture interaction. A gesture interaction can be analyzed for a direction of motion (e.g., horizontal direction and/or vertical direction) of a user's interaction with virtual control element 106. For example, the recorded gesture interaction can be analyzed to determine the direction of the gesture interaction (e.g., vertically up or vertically down) to determine whether to change the state of virtual control element 106 functioning as a switch (e.g., vertically up: turn on, vertically down: turn off, or do not change).

Although the vertical directions are used to describe the function of virtual control element 106 as a switch, embodiments of the present disclosure are not so limited. For example, virtual control element 106 can be defined to function using gesture interactions in any other direction.

The recorded gesture interaction can be analyzed for a speed of the gesture interaction. A gesture interaction can be analyzed for a speed of motion of a user's interaction with virtual control element 106. For example, the recorded gesture interaction can be analyzed to determine the speed of the gesture interaction to determine whether to change the state of virtual control element 106.

A speed of the gesture interaction can be used to determine whether a gesture interaction was intentional or unintentional. For example, a gesture interaction performed too quickly can be disregarded as an unintentional gesture interaction to help prevent unintentional modifications of settings in building space 102.

The recorded gesture interaction can be analyzed for a shape of the gesture interaction. A gesture interaction can be analyzed for a shape (e.g., a square motion, a circle motion, a double-swipe motion, a forward-backward swipe motion, etc.) The recorded gesture interaction can be analyzed to determine the shape of the gesture interaction to determine whether to change the state of virtual control element 106. For example, a circle motion can be analyzed to determine whether to change the state of virtual control element 106 to a different setting. As another example, a double-swipe motion can be analyzed to determine whether to change the state of virtual control element 106 to a maximum setting.

As a further example, a forward-backward swipe motion can be analyzed to determine whether to change the state of virtual control element 106 to a default setting.

The recorded gesture interaction can be analyzed for a position of the gesture interaction. A gesture interaction can be analyzed for a position of motion of a user's interaction with virtual control element 106. For example, the recorded gesture interaction can be analyzed to determine an amount of state change of virtual control element 106 based on the user's recorded gesture interaction with virtual control element 106. For example, virtual control element 106 can be functioning as a slider, and the position of the recorded gesture interaction can be analyzed to determine the amount of state change of virtual control element 106.

Gesture characteristics can correspond to the respective function of each virtual control element 106 (e.g., a button, slider, or switch). For example, controller 108 can analyze the direction of the gesture interaction to determine whether virtual control element 106 functioning as a button has been "pressed" or whether virtual control element 106 functioning as a switch has been "switched". As another example, controller 108 can analyze the gesture interaction to determine a position virtual control element 106 functioning as a slider has been "moved".

Analysis of the gesture interaction can include determining whether the gesture interaction is one of a number of pre-defined gesture interactions. Determination of a pre-defined gesture interaction can help to determine whether a gesture interaction was intentional or unintentional. For example, a user's gesture interaction (e.g., pointer finger raised with horizontally up movement) with virtual control element 106 that is a pre-defined gesture interaction (e.g., pointer finger raised with horizontally up movement, pointer finger raised and moved in a circle motion, etc.) can ensure the intended function of virtual control element 106 is accomplished and can help to prevent unintentional modifications of settings in building space 102.

Controller 108 can modify a setting of space 102 based on the virtual control element 106 and the gesture characteristics. For example, controller 108 can modify a setting of building space 102 based on virtual control element 106 functioning as a switch, and the gesture characteristics (e.g., direction of gesture interaction and speed of gesture interaction) indicating the switch being "switched".

Modifying a setting of building space 102 can include modifying a lighting intensity level of a lighting control device 110 of space 102, where the setting of space 102 is a lighting setting. As used herein, a lighting setting can include control of a light switch, a light dimmer, and/or control of window blinds.

For example, a gesture interaction with virtual control element 106 can include a user having their pointer finger raised and moving their hand in an upward direction in front of virtual control element 106 in order to switch off lights located in building space 102. As another example, a gesture interaction with virtual control element 106 can include a user having all fingers raised and held together and moving their hand in a horizontal direction in front of virtual control element 106 functioning as a slider in order to dim lights located in building space 102 and/or raise or lower window blinds located in building space 102.

Although the gesture interaction is described as a user having their pointer finger raised and moving their hand in an upward direction and having all fingers raised and held together and moving their hand in a horizontal direction to switch off, dim lights, or raise/lower blinds located in building space 102, embodiments of the present disclosure are not so limited. For example, the gesture interaction can be any other gesture interaction to switch off, dim lights, or raise/lower blinds located in building space 102.

A lighting control device 110 of building space 102 can modify one or more lighting zones in space 102. For example, a first bank of lighting can correspond to a first section of building space 102, and a second bank of lighting can correspond to a second section of building space 102, where the first bank of lighting and the second bank of lighting can be turned on/off and/or dimmed by multiple virtual control elements 106, allowing multiple users to interact with multiple virtual control elements 106 simultaneously.

A lighting control device 110 of building space 102 can include controlling all lighting in space 102. For example, the lighting in building space 102 can be turned on/off and/or dimmed by a single virtual control element 106. As another example, the lighting in building space 102 can be turned on/off and/or dimmed by multiple virtual control elements 106.

Modifying a setting of space 102 can include modifying a temperature setting of a thermostat 112 of space 102, where the setting of space 102 is a temperature setting. For example, a gesture interaction with virtual control element 106 can include a user having their pointer finger raised and moving their hand in a horizontal direction in front of virtual control element 106 functioning as a slider in order to raise or lower the temperature setting of a thermostat 112 of building space 102.

Although the gesture interaction is described as a user having their pointer finger raised and moving their hand in a horizontal direction to raise or lower the temperature setting of a thermostat 112 in building space 102, embodiments of the present disclosure are not so limited. For example, the gesture interaction can be any other gesture interaction to raise or lower the temperature setting of a thermostat 112 in building space 102.

Controller 108 can define an additional virtual control element to be located in building space 102 associated with a setting of building space 102 by receiving a recording of a command gesture from cameras 104-1, 104-2, and/or 104-3. A command gesture, as used herein, can include a gesture interaction with an existing virtual control element (e.g., virtual control element 106) that can be a pre-defined gesture associated with defining an additional virtual control element.

Defining the additional virtual control element can include receiving a virtual control area in building space 102 from cameras 104-1, 104-2, and/or 104-3 for the additional virtual control element. The virtual control area in building space 102 can correspond to the additional virtual control element in building space 102. The additional virtual control element can be a sticker, a defined area in building space 102, or a structured light.

In some embodiments, a defined area in building space 102 can be defined by an additional gesture recorded by cameras 104-1, 104-2, and/or 104-3. An additional gesture can be a pre-defined gesture recorded by cameras 104-1, 104-2, and/or 104-3 to allow controller 108 to define the defined area that corresponds to the virtual control area of the additional virtual control element in space 102. For example, a user can perform the pre-defined gesture, and then define the defined area (e.g., top right edge of user's computer monitor) corresponding to the virtual control area of the additional virtual control element in building space 102.

Defining the additional virtual control element can include receiving a recording of an additional gesture interaction and gesture characteristics associated with the additional virtual control element from cameras 104-1, 104-2, and/or 104-3. The additional gesture interaction and gesture characteristics can be saved by controller 108, and the corresponding function of the additional virtual control element can be associated with the additional gesture interaction and gesture characteristics by controller 108.

Controller 108 can define an additional virtual control element to be located in building space 102 associated with a setting of building space 102 by receiving, from a graphical user interface, a command instruction. A command instruction, as used herein, can include an instruction associated with defining an additional virtual control element. A command instruction can be sent to controller 108 via a graphical user interface of a mobile device. As used herein, a mobile device can include devices that are (or can be) carried and/or worn by a user. A mobile device can be a phone (e.g., a smart phone), a tablet, a personal digital assistant (PDA), and/or a wrist-worn device, among other types of mobile devices.

Although described as receiving a command instruction via a graphical user interface of a mobile device, embodiments of the present disclosure are not so limited. For example, the command instruction can be received via a graphical user interface of any other device.

Defining the additional virtual control element can include receiving a virtual control area in building space 102 from cameras 104-1, 104-2, and/or 104-3 for the additional virtual control element. The virtual control area in the space 102 can correspond to the additional virtual control element in building space 102. The additional virtual control element can be a sticker, a defined area in building space 102, or a structured light.

In some embodiments, defining the additional virtual control area can include receiving a virtual control area in building space 102 for the additional virtual control element from the graphical user interface of the mobile device. The virtual control area in the space 102 can be selected via the graphical user interface of the mobile device, and can correspond to the additional virtual control element in building space 102. The additional virtual control element can be a sticker, a defined area in building space 102, or a structured light.

In some embodiments, a defined area in building space 102 can be defined by an additional gesture recorded by cameras 104-1, 104-2, and/or 104-3. An additional gesture can be a pre-defined gesture recorded by cameras 104-1, 104-2, and/or 104-3 to allow controller 108 to define the defined area that corresponds to the virtual control area of the additional virtual control element in space 102. For example, a user can perform the pre-defined gesture, and then define the defined area (e.g., top right edge of user's computer monitor) corresponding to the virtual control area of the additional virtual control element in space 102.

Defining the additional virtual control element can include receiving a recording of an additional gesture interaction and gesture characteristics associated with the additional virtual control element from cameras 104-1, 104-2, and/or 104-3. The additional gesture interaction and gesture characteristics can be saved by controller 108, and the corresponding function of the additional virtual control element can be associated with the additional gesture interaction and gesture characteristics by controller 108.

An additional virtual control element associated with building space 102 can be linked to controller 108. For example, an additional virtual control element can be linked to controller 108 so that controller 108 can perform the function of the additional virtual control element.

In some embodiments, the additional virtual control element can be automatically linked to controller 108. For example, after defining the additional virtual control element as a switch associated with a bank of lights located in building space 102, controller 108 can associate the function (e.g., switch) with the additional virtual control element automatically.

In some embodiments, the additional virtual control element can be linked to controller 108 using a graphical user interface of a mobile device. For example, after defining the additional virtual control element as a slider associated with control of window blinds located in building space 102, a user can associate the function (e.g., slider) with the additional virtual control element for controller 108 via the graphical user interface of the mobile device.

Figure 2:
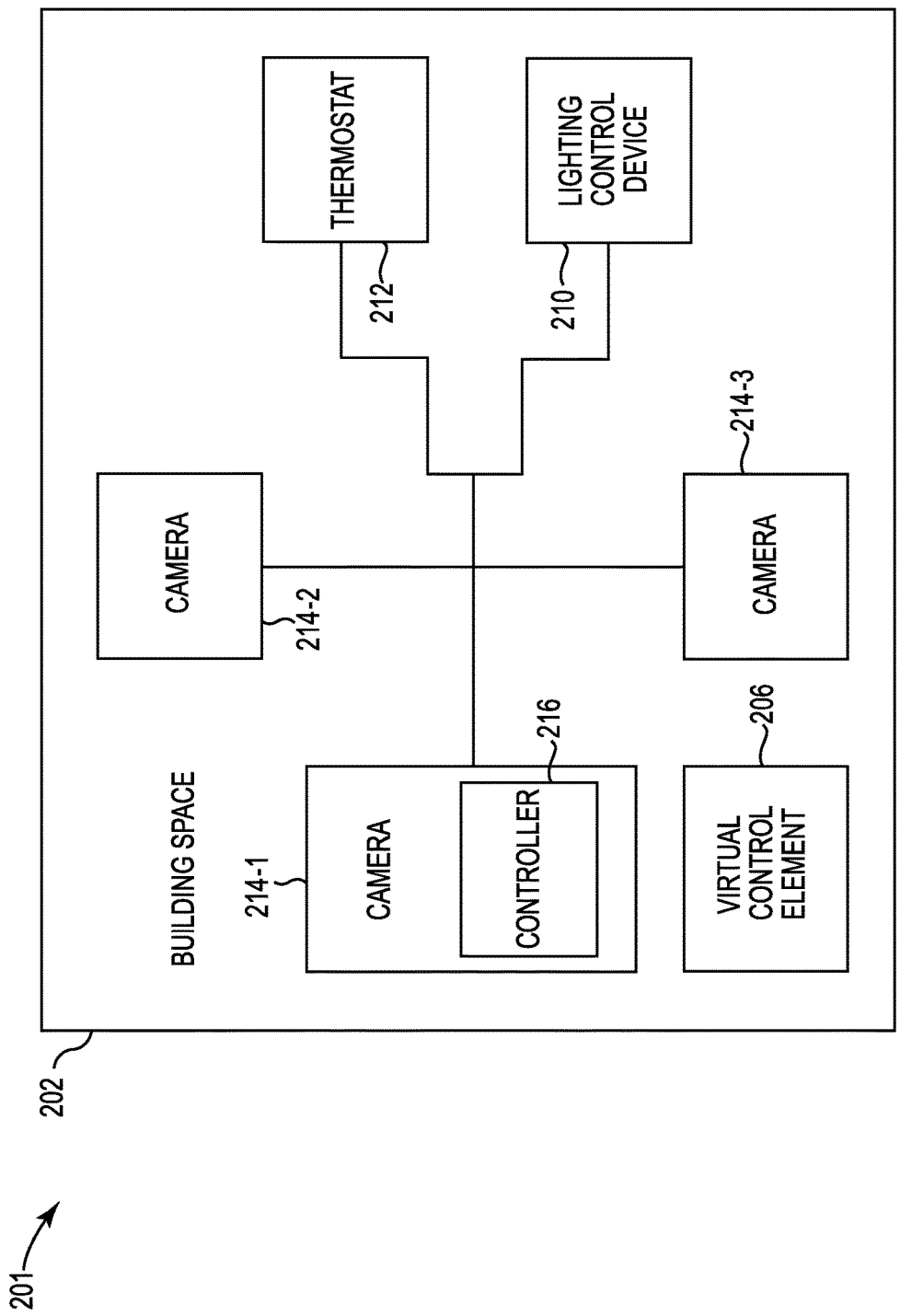
FIG. 2 illustrates a system for building space control, in accordance with one or more embodiments of the present disclosure.

FIG. 2 illustrates a system 201 for building space control, in accordance with one or more embodiments of the present disclosure. As shown in FIG. 2, the system 201 can include building space 202, cameras 214-1, 214-2, and 214-3, virtual control element 206, controller 216, lighting control device 210, and thermostat 212.

Controller 216 can be part of camera 214-1. For example, camera 214-1 can include controller 216 and can share the hardware resources with the logic of camera 214-1. Similar to the embodiment described in FIG. 1, controller 216 can receive, from cameras 214-1, 214-2, and 214-3, a recording of a gesture interaction with virtual control element 206, analyze the recorded gesture interaction for gesture characteristics, and modify a setting of building space 202 based on the virtual control element 206 and the gesture characteristics. For example, modifying a setting of building space 202 can include modifying a lighting intensity level of a lighting control device 210 of building space 202, and/or modifying a temperature setting of a thermostat 212 of building space 202.

Although not shown in FIG. 2 for clarity and so as not to obscure embodiments of the present disclosure, building space 202 can include more than one virtual control element 206. For example, building space 202 can include multiple virtual control elements 206. Multiple virtual control elements 206 can allow for simultaneous control of lighting control device 210 and/or thermostat 212 by multiple users.

The recording of a gesture interaction can be received by controller 216 from cameras 214-1, 214-2, and 214-3 in building space 202. For example, cameras 214-1, 214-2, and 214-3 can record a gesture interaction by a user with virtual control element 206. Camera 214-1 can transmit the recording directly to controller 216 located within camera 214-1. Cameras 214-2 and 214-3 can transmit the recording to controller 216 via a network relationship. For example, the recording of the gesture interaction can be transmitted to controller 216 via a wired or a wireless network.

The wired or wireless network can be a network relationship that connects cameras 214-2, and 214-3 to controller 216. Examples of such a network relationship can include a local area network (LAN), wide area network (WAN), personal area network (PAN), a distributed computing environment (e.g., a cloud computing environment), and/or the Internet, among other types of network relationships.

Although controller 216 is shown in FIG. 2 as part of camera 214-1, embodiments of the present disclosure are not so limited. For example, controller 216 can be part of camera 214-2, where camera 214-1 and camera 214-3 can transmit a recording of a gesture interaction to controller 216 via a wired or wireless network relationship. As another example, controller 216 can be part of camera 214-3, where camera 214-1 and camera 214-2 can transmit a recording of a gesture interaction to controller 216 via a wired or wireless network relationship.

Although building space 202 is shown in FIG. 2 as including three cameras, embodiments of the present disclosure are not so limited. For example, building space 202 can have less than three cameras or more than three cameras. Further, controller 216 can be part of any camera in building space 202.

Although not shown in FIG. 2 for clarity and so as not to obscure embodiments of the present disclosure, building space 202 can include more than one controller 216. That is, cameras 214-1, 214-2, and 214-3 can each include a controller. For example, cameras 214-1, 214-2, and 214-3 can each record a gesture interaction from a user, and each controller in corresponding cameras 214-1, 214-2, and 214-3 can separately analyze the recorded gesture interaction for gesture characteristics; each controller can then collaborate on whether to modify a setting of building space 202 based on virtual control element 206 and the gesture characteristics recorded by cameras 214-1, 214-2, and 214-3. As another example, each controller of cameras 214-1, 214-2, and 214-3 can collaborate to analyze the recorded gesture interaction for gesture characteristics.

Although cameras 214-1, 214-2, and 214-3 are described as each having a controller, embodiments of the present disclosure are not so limited. For example, two of cameras 214-1, 214-2, and 214-3 can have a controller (e.g., 214-1 and 214-2, 214-1 and 214-3, or 214-2 and 214-3).

FIG. 3 is a schematic block diagram of a controller 318 for building space control, in accordance with one or more embodiments of the present disclosure. Controller 318 can be, for example, controllers 108 and 216, previously described in connection with FIGS. 1 and 2, respectively. For example, controller 318 can include a memory 322 and a processor 320 configured for building space control in accordance with the present disclosure.

The memory 322 can be any type of storage medium that can be accessed by the processor 320 to perform various examples of the present disclosure. For example, the memory 322 can be a non-transitory computer readable medium having computer readable instructions (e.g., computer program instructions) stored thereon that are executable by the processor 320 to receive a recording of a gesture interaction with a virtual control element and analyze the recorded gesture interaction for gesture characteristics. Further, processor 320 can execute the executable instructions stored in memory 322 to modify a setting of a space based on a virtual control element and gesture characteristics associated with a gesture interaction.

The memory 322 can be volatile or nonvolatile memory. The memory 322 can also be removable (e.g., portable) memory, or non-removable (e.g., internal) memory. For example, the memory 322 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 322 is illustrated as being located within controller 318, embodiments of the present disclosure are not so limited. For example, memory 322 can also be located internal to another computing resource (e.g., enabling computer readable instructions to be downloaded over the Internet or another wired or wireless connection).

FIG. 4 is a flow chart of a method 424 for building space control, in accordance with one or more embodiments of the present disclosure. Method 424 can be performed by, for example, controllers 108, 216, and 318, as described in connection with FIGS. 1, 2, and 3, respectively.

At block 426 of method 424, the controller can receive a recording of a gesture interaction associated with a setting of a space in a building (e.g., building space 102 and 202, as previously described in connection with FIGS. 1 and 2, respectively). For example, one or more cameras (e.g., cameras 104-1, 104-2, and/or 104-3, as previously described in connection with FIG. 1, and cameras 214-1, 214-2, and/or 214-3, as previously described in connection with FIG. 2) can record a gesture interaction of a user with a virtual control element (e.g., virtual control element 106 and 206, as previously described in connection with FIGS. 1 and 2, respectively). The virtual control element can be a sticker, a defined space, or structured light, and can function as a button, slider, or switch.

At block 428 of method 424, the controller can analyze the recorded gesture interaction for gesture characteristics. The controller can analyze the gesture characteristics for a direction, speed, shape, and/or position of the gesture interaction. For example, the controller can analyze a recorded gesture interaction to determine the direction and speed of a gesture interaction. As another example, the controller can analyze a recorded gesture interaction to determine the position of a gesture interaction.

At block 430 of method 424, the controller can modify the setting of the space based on the virtual control element and the gesture characteristics. For example, the controller can modify a temperature setting of a thermostat (e.g., thermostat 112 and 212 as previously described in connection with FIGS. 1 and 2, respectively) in a building space based on the gesture characteristics (e.g., the direction and position of the gesture interaction) and the virtual control element (e.g., a slider). As another example, the controller can modify a lighting intensity level of a lighting control device (e.g., lighting control device 110 and 210 as previously described in connection with FIGS. 1 and 2, respectively) in a building space based on the gesture characteristics (e.g., the direction of the gesture interaction) and the virtual control element (e.g., a switch).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for building space control, comprising:
    a memory;
    a processor configured to execute executable instructions stored in the memory to:
        receive a recording of a gesture interaction with a virtual control element, wherein the virtual control element is a physical sticker located in a space of a building and is associated with a setting of the space in the building;
        analyze the recorded gesture interaction for gesture characteristics, wherein the gesture characteristics include a speed of the gesture interaction and a unique configuration of a user's fingers and hand while performing the gesture interaction with the virtual control element;
        determine, based on the speed of the gesture interaction, whether the gesture interaction is an intentional gesture interaction or an unintentional gesture interaction; and
        modify, in response to the gesture interaction being an intentional gesture interaction, the setting of the space based on the virtual control element and the unique configuration of the user's fingers and hand while performing the gesture interaction with the virtual control element.

2. The controller of claim 1, wherein the recording of the gesture interaction is received from a camera in the space.

3. The controller of claim 1, wherein the controller is part of a camera.

4. The controller of claim 1, wherein the analysis of the gesture interaction includes determining whether the gesture interaction is one of a number of pre-defined gesture interactions.

5. The controller of claim 1, wherein the setting of the space is a lighting setting of the space.

6. The controller of claim 1, wherein the setting of the space is a temperature setting of the space.

7. A computer implemented method for building space control, comprising:
    receiving, from a camera, a recording of a gesture interaction with a virtual control element, wherein the virtual control element is a physical sticker located in a space of a building and is associated with a temperature setting of the space in the building;
    analyzing, by a controller, the recorded gesture interaction for gesture characteristics, including:
        a unique configuration of a user's fingers and hand while performing the gesture interaction with the virtual control element;
        a direction of the gesture interaction;
        a speed of the gesture interaction;
        a shape of the gesture interaction; and
        a position of the gesture interaction;
    determining, by the controller, whether the gesture interaction is an intentional gesture interaction or an unintentional gesture interaction based on the speed of the gesture interaction; and modifying, by the controller in response to the gesture interaction being an intentional gesture interaction, the temperature setting of the space based on the virtual control element and the gesture characteristics including the unique configuration of the user's fingers and hand while performing the gesture interaction with the virtual control element.

8. The method of claim 7, wherein modifying the setting of the space includes modifying a lighting intensity level of a lighting control device of the space.

9. The method of claim 7, wherein modifying the setting of the space includes modifying a temperature setting of a thermostat of the space.

10. The method of claim 7, wherein the method includes receiving, from the camera, a recording of a command gesture to define an additional virtual control element associated with a setting of the space, wherein defining the additional virtual control element includes:
  receiving, from the camera, a virtual control area in the space for the additional virtual control element; and
  receiving, from the camera, a recording of an additional gesture interaction and gesture characteristics associated with the additional virtual control element.

11. The method of claim 7, wherein the method includes receiving, from a graphical user interface, a command instruction to define an additional virtual control element associated with a setting of the space, wherein defining the additional virtual control element includes:
  receiving, from the camera, a virtual control area in the space for the additional virtual control element; and
  receiving, from the camera, a recording of an additional gesture interaction and gesture characteristics associated with the additional virtual control element.

12. The method of claim 7, wherein the method includes linking an additional virtual control element associated with the space to the controller.

13. A system for building space control, including:
  a number of cameras configured to capture recordings of a number of gesture interactions with a number of virtual control elements, wherein the number of virtual control elements are physical stickers located in a space of a building, and wherein a particular one of the number of virtual control elements is associated with a lighting setting of the space of the building;
  a controller, configured to:
    receive, from the number of cameras, the captured recordings associated with a number of settings of the space in the building;
    analyze a particular gesture interaction of the recorded gesture interactions that is associated with the particular one of the virtual control elements for gesture characteristics, including:
      a unique configuration of a user's fingers and hand while performing the particular gesture interaction with the particular one of the virtual control elements;
      a direction of the gesture interaction;
      a speed of the gesture interaction;
      a shape of the gesture interaction; and
      a position of the gesture interaction;
    determine whether the particular gesture interaction is an intentional gesture interaction or an unintentional gesture interaction based on the speed of the gesture interaction; and
    modify, in response to the particular gesture interaction being an intentional gesture interaction, the lighting setting of the space based on the particular one of the virtual control elements and the gesture characteristics including the unique configuration of the user's fingers and hand while performing the unique gesture interaction with the virtual control element.

14. The system of claim 13, wherein each of the number of virtual control elements function as a button, a slider, or a switch.

15. The system of claim 14, wherein the gesture characteristics correspond to the respective function of each virtual control element.

16. The system of claim 13, wherein modification of the one or more of the number of settings includes a modification of a setting of one or more lighting zones in the space.

17. The system of claim 13, wherein the number of cameras are positioned in the space to prevent the number of cameras' views of the number of virtual control elements from being obstructed.

* * * * *